US005486853A

United States Patent [19]
Baxter et al.

[11] Patent Number: 5,486,853
[45] Date of Patent: Jan. 23, 1996

[54] ELECTRICAL CABLE INTERFACE FOR ELECTRONIC CAMERA

[75] Inventors: Larry K. Baxter, Gloucester; John J. Coffey, Northborough, both of Mass.

[73] Assignee: PictureTel Corporation, Peabody, Mass.

[21] Appl. No.: 355,036

[22] Filed: Dec. 13, 1994

[51] Int. Cl.⁶ .................................................. H04N 5/228
[52] U.S. Cl. ............................ 348/222; 348/552; 348/12; 348/6; 358/909.1
[58] Field of Search ...................................... 348/222, 552, 348/722, 13, 12, 6, 4; 358/909.1; H04N 5/228

[56] References Cited

U.S. PATENT DOCUMENTS 4,728,804  3/1988  Norsworthy .......................... 348/222
5,389,968  2/1995  Koyanagi .............................. 348/222

Primary Examiner—James J. Groody
Assistant Examiner—Sherrie Hsia
Attorney, Agent, or Firm—Fish & Richardson

[57] ABSTRACT

The invention features a video camera system where horizontal and vertical synchronizing signals and a pixel clock signal are generated and added to analog video signals from a video imaging device within an electronic camera head that is connected, via an electrical cable, to a remote host processor having digital signal processing circuitry for processing the video signals. The analog video signals generated by the video imaging device received by the host processor, over the electrical cable, are converted to digital video signals at the remote host, and are then processed by the digital signal processing circuitry.

33 Claims, 4 Drawing Sheets

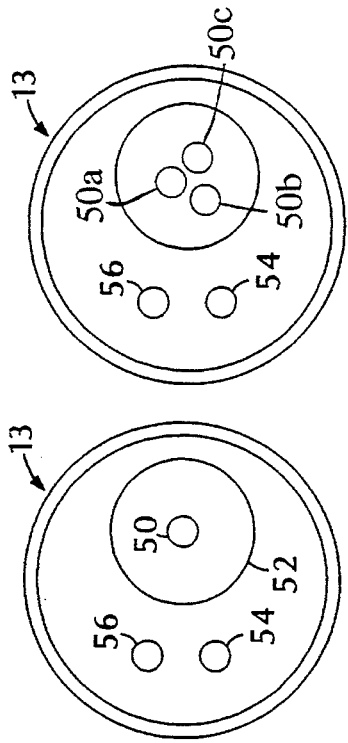
FIG. 7A
FIG. 7B
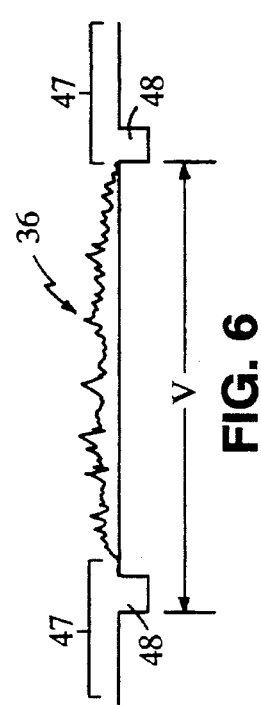
FIG. 6
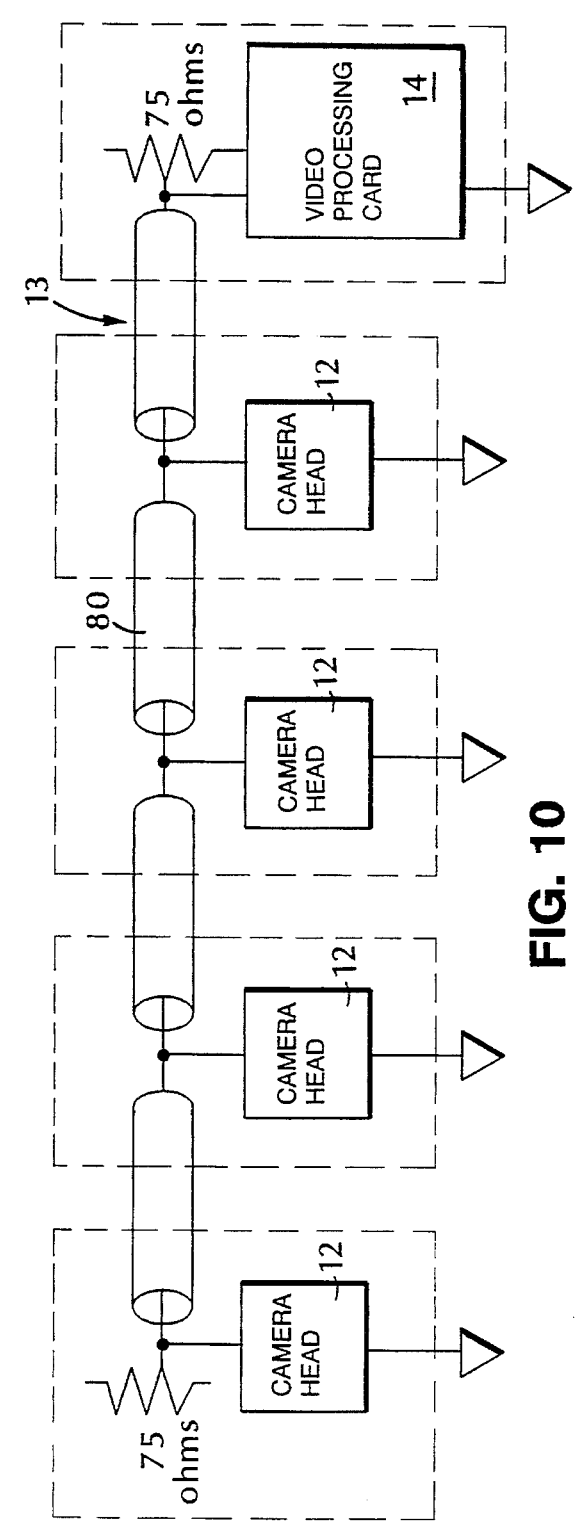
FIG. 10

ELECTRICAL CABLE INTERFACE FOR ELECTRONIC CAMERA

BACKGROUND OF THE INVENTION

The invention relates to video imaging camera systems.

Presently, there exist three primary encoding/decoding standards used in broadcasting color television analog signals. The NTSC (National Television Standards Committee) standard is used exclusively in North America and widely in Latin America and Japan. The PAL (Phase Alternate by Line) standard is used in the United Kingdom, most of western Europe, and Australia. Finally, the SECAM (Sequential Color with Memory) standard is used in France and eastern Europe. Each standard has its own set of specifications, each defining, for example, its own horizontal line frequency, color burst frequency, and number of lines per frame. Video cameras, whether a professional television camera or a consumer-grade camcorder, process their video signals so that their images can be viewed on a display monitor conforming to one of the above described standards. More recently, video cameras are being used as inputs for computers, where the output is a computer monitor. No interface standard has been adopted for this use.

Due to advances in electronics, the recent trend for conforming the analog signals to one of the above standards is through digital signal processing techniques. Digital signal processing generally offers higher quality video through digital storage and transmission of signals thereby preserving the integrity of the signal. Digital processing also provides more accurate control and elimination of coupling components between circuits which can break down or distort the video signals.

In some applications, processing the "raw" analog signals from the video imaging pickup device of the camera (e.g., vidicon, plumbicon, CCD) is performed, either digitally or in the analog format, at the camera itself so that the output signal from the camera can be provided directly to a display monitor. Where digital signal processing is used in an electronic camera, the analog video signals from the video pickup device are first converted to digital signals using an A/D converter. Luminance and chroma signal processing is then performed on the digital signals, which are then encoded. The digitally encoded video signals are then reconverted back, using a D/A converter, into one of the standard analog television formats (e.g., NTSC) for transmission or display on a monitor. However, in some applications, further digital signal processing, unrelated to the digital camera processing performed within the camera, is desired, for example, to compress, decompress, or provide other functions. In these applications, where digital processing is performed other than at the camera, the NTSC analog video signal is transmitted from the camera to the host for further processing, converted once again to digital data, processed, and then reconverted once again to NTSC analog video for display on a monitor. With each conversion and reconversion of the video signal comes a degradation in the quality of the signal. Moreover, where the conversion is made to a particular analog format, such as NTSC, certain information in the raw analog video signal, not needed by the NTSC receiver, is forever lost and unrecoverable. This lost information may be useful to the subsequent digital processor.

To avoid this information loss, other systems transmit from the camera the video signals in their digitally encoded format for further processing or reconversion to analog at the display monitor. In such systems, the digital video signals can be transmitted either in serial or parallel format. Transmitting the digital video signals in parallel requires a larger electrical cable with many more wires and larger connectors to interface the cable to the external processor. For example, one parallel digital bus known as SMPTE RP-125 uses a 25 pin D-type subminiature connector. Another problem with transmitting digital signals is that electrical cables longer than 20 meters generally require equalization.

To overcome the problems with parallel buses (e.g., large cables, large connectors and limited cable length) the digital video data can be transmitted over high speed serial interfaces. For example, 8 bit (240 Mbit/sec) and 10 bit (270 Mbit/sec) serial transmission interfaces have been used. In these serial interfaces 8 bit and 10 bit data words are serialized and transmitted down a standard 75Ω video coaxial cable or an optical fiber. However, serial interfaces generally require a much larger bandwidth for transmitting the video data: whereas analog NTSC requires 6 MHz, digital serial transmission of the NTSC signal requires over 100 Mbps.

SUMMARY OF THE INVENTION

The invention features a video camera system including an electronic camera head where horizontal and vertical synchronizing signals and pixel clock signals are generated and transmitted along with analog video signals generated by a solid-state video imager to a remote host processor. The electronic camera head is connected, via an electrical cable, to the remote host processor having digital signal processing circuitry for processing the analog video signals. The analog signals are converted to digital video signals and then processed by the digital signal processing circuitry.

In one embodiment, the horizontal and vertical synchronizing signals and pixel clock signal are added to the analog video signals generated by the solid-state video imager before being transmitted to the remote host processor. At the remote host processor, the analog video signals are separated from the added horizontal and vertical synchronizing signals and pixel clock signal.

The advantages of the invention are numerous. In particular, all of the digitally performed "intelligence" processing is located within a remote host processor, such as a video processing card of a personal computer, with only the analog processing, needed to prepare the raw analog signals for noise-free transmission, remaining in the camera head. Thus, the quality of the raw video image data from the video imaging device is maintained and important information is not lost during conversion/reconversion from analog to digital and back to analog format. In certain applications, the digitally processed signals at the host processor may be processed further for reasons not directly related to the digital camera processing. For example, in a video teleconferencing system, compression, decompression, or improved AGC and white balancing functions may be used to process the video images before being transmitted over a communications channel. In this application, the digital processing related to the camera processing functions may be ultimately merged with the video compression processing into a single processor. Tightly integrating the different processing functions provides an optimized system at a reduced cost and provides enhanced performance. The advantages of integrating different and more sophisticated processing functions will become more apparent with the continued increase in the power of digital signal processing integrated circuits.

Moving the digital portion of the signal processing to the external host processor allows the electronic camera head to be smaller, thereby reducing its cost and increasing its reliability. Because the electronic camera head is only required to provide a minimally processed video analog signal, independent of any accepted television broadcasting standard, such as NTSC, simple camera circuits can be used. An NTSC, YUV, or Y/C modulator is not required to be included within the electronic camera head to condition the analog video signals into one of the adopted standards. Further, the camera may be format-independent, with one camera serving both PAL and NTSC markets.

Moreover, because only the analog "raw" video signal is transmitted to the remote host processor, the electrical cable can be made smaller and at a reduced cost since only a single pair of wires is needed for conveying the raw analog video signals between the camera head and external processor. An additional pair of wires for providing electrical power to the CCD may also be used, unless the electronic camera head is battery operated, or if an external power supply is used. As is known in the art, transmitting digital signals in parallel format requires a cable with many more wires and if the signals are transmitted serially, the bandwidth of the channel must be increased.

The interface allows the use of widely different camera formats. For example, the interface may be used with both interlaced and non-interlaced systems, as well as different resolution and scan rates. The remote host processor receives data information including its resolution, scan rate and whether it is color or monochrome, from the solid-state imager so as to determine the appropriate digital processing.

Furthermore, this approach facilitates daisy-chaining multiple electronic cameras along the electrical cable which serves as a video bus. The cameras may also be genlocked, with the cameras switched during transmission of active video. As is known in the art, genlocking is the process of locking both sync and burst of one camera's output signal to sync and burst of another, so that the two signals are completely synchronous.

Embodiments of the invention include one or more of the following features.

The video pickup device of the electronic camera head is preferably a charge coupled device (CCD). The electronic camera head includes a sampling circuit for extracting the reset pulse carrier signal from the raw analog video signals generated by the CCD. The timing generating circuitry includes an adder circuit for adding the horizontal and vertical synchronizing signals and the pixel clock signal to the demodulated analog video signals. In other embodiments, these three signals may be transmitted over separate wires of the cable or multiplexed together and transmitted over a single wire. A blanking circuit may be used to blank a portion of the video signal waveform for each horizontally scanned line of a frame and at the beginning of each one of the two interlaced vertical fields of a frame. The adder circuit then adds the horizontal and vertical synchronizing signals and pixel clock signal to the blanked portion. A circuit may be added for providing gamma correction to the analog video signals before conveying the signals to the adder circuit.

The host processor includes a filtering circuit for receiving the analog signals from the camera head and for extracting the horizontal and vertical synchronizing signals and pixel clock signal from the analog video signals. A synchronizing circuit within the host processor receives the pixel clock signal from the filtering circuit and synchronizes the digital video signal with a local clock of the host processor. The synchronized digital video signals are then digitally processed by the digital signal processing circuitry of the host processor. The host processor may also include a D/A converter for converting the digital video signals, processed by the digital signal processing circuit, to analog video signals for transmission to a display monitor. Alternatively, the host processor may include additional digital signal processing, such as video compression or decompression circuitry for compressing or decompressing the digital video signals processed by the digital signal processing circuit. In one embodiment, the digital signal processing circuit is merged with the video compression or decompression circuitry.

The electronic camera head may include a processor for receiving information from the video imaging pickup device and for providing the information to the adder circuit for adding to the analog video signal. This information may include camera identification, CCD type, serial number, self-test status, and lens status information.

In another aspect of the invention, a method of providing an interface within an electronic camera having a solid-state video imager includes the following steps:

providing a video waveform comprising analog video signals from the solid-state video imager;

providing a demodulated video signal by extracting a reset pulse carrier signal from the analog video signals;

providing a horizontal synchronizing signal, vertical synchronizing signal, and a pixel clock signal;

generating an output video signal by adding the horizontal synchronizing signal, vertical synchronizing signal, and the pixel clock signal to the demodulated video signal; and conveying the output video signal to an external video processor over a length of analog video signal carrying cable.

In preferred embodiments, one or more of the following steps may be included.

A portion of the video signal waveform comprising the analog video signals is blanked with the horizontal and vertical synchronizing signals and pixel clock signal added to the blanked portion. The demodulated video signal is gamma corrected. Data information (e.g., camera identification, CCD serial number) provided by the solid-state video imager is added to the demodulated video signal. A lens system is positioned at a location distal to a front face of the solid-state video imager for focusing optical images on the front face of the CCD. The distance between the lens system and CCD is variably controlled to provide a focusing effect. Information control signals, for example, camera control signals may be added by the external processor to the blanked portion for transmission to the electronic camera.

BRIEF DESCRIPTION OF THE DRAWING

FIG. 6 represents the analog waveform of the video signal between successive vertical synchronizing pulses.

FIG. 7A is a cross-sectional view of the coaxial cable of FIG. 1.

FIG. 7B is a cross-sectional view of an alternate embodiment of the coaxial cable of FIG. 1.

FIG. 10 is a schematic representation of a plurality of camera heads connected to a cable.

DESCRIPTION OF THE PREFERRED EMBODIMENTS

Figure 1:
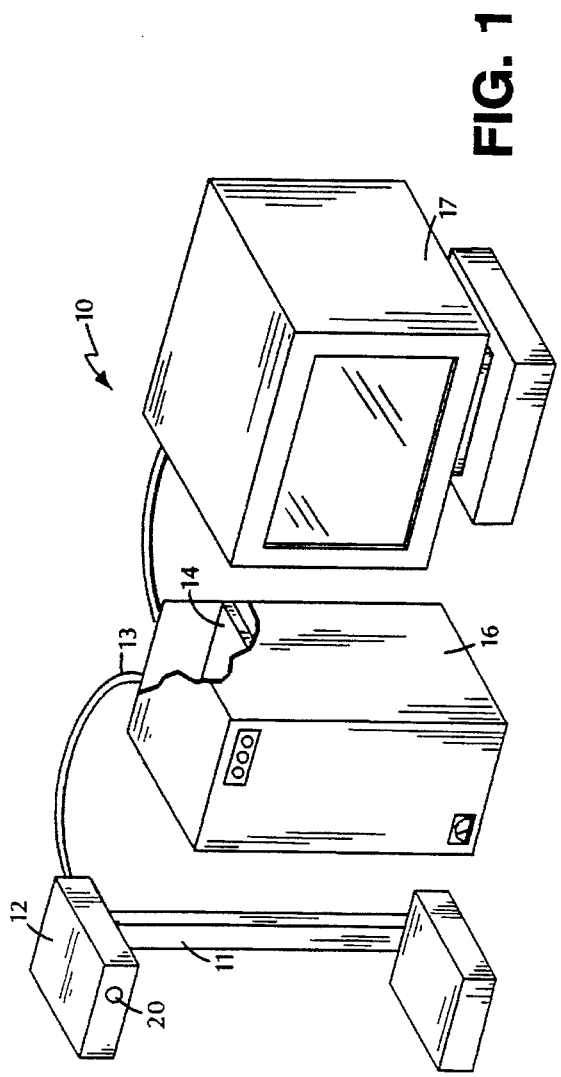
FIG. 1 is a perspective view of an electronic video camera system in accordance with the invention.

Referring to FIG. 1, a video camera system 10 includes a video electronic camera head 12 mounted on a camera stand 11. Camera head 12 provides analog video signals over an electrical cable 13 to a host processor, here a video processor card 14, inserted within personal computer 16, where the signals are digitally processed before being displayed on a monitor 17.

Figure 2:
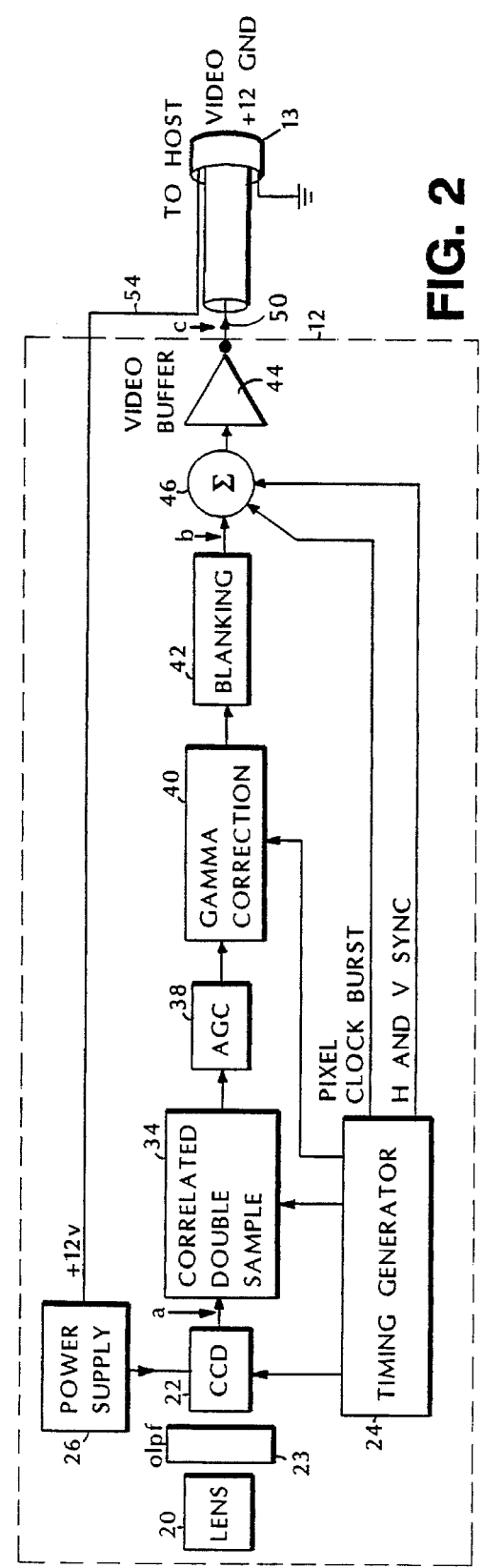
FIG. 2 is a block diagram of an electronic camera head of FIG. 1.

In the presently most preferred embodiment, shown in FIG. 2, camera head 12 includes a lens 20 for focusing the image being viewed on the front face of an electro-optical sensor, here a charge-coupled device (CCD) 22 which converts optical images of received light into raw analog video signals. Interposed between lens 20 and CCD 22 is an optical low pass filter (OLPF) 23, a fluoride crystal which defocuses the image slightly, thereby improving the chroma response in the presence of high-spatial-frequency input images. OLPF 23 also includes a filter for reducing the amount of infrared passing to CCD 22.

CCD 22 is an NTSC (National Television Standards Committee) format color stripe CCD, such as Product No. ICX058, manufactured by Sony Electronics, Inc., Component Products Division, San Jose, Calif. Timing signals provided by a timing generator 24 shift the electrical charge packets within the CCD appropriately and also determine the sampling and frame rate at which each horizontally scanned line of pixels is read out from CCD 22. Timing generator 24, Product No. CXD 1265, manufactured by Sony Electronics, Inc., Component Products Division, San Jose, Calif., is described in further detail below. A power supply 26, located within camera head 12, receives +12 volts from an external supply and generates output voltages of +20, +15, +5, and −9 volts for driving CCD 22.

Figure 3:
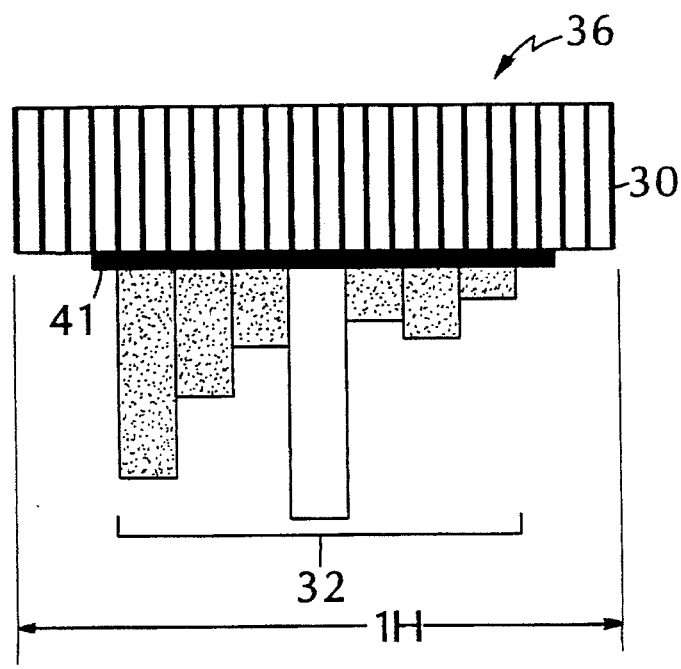
FIG. 3 represents the analog waveform of the video signal at letter a of FIG. 2.

Referring to FIG. 3, a representation of the analog video waveform output 28 from CCD 22 for one horizontally scanned line (designated by letter a in FIG. 2) shows that the raw analog video output includes a reset pulse carrier 30. Reset pulse carrier 30 is an undesired and intrinsic artifact generated by CCD 22 and is generally removed to improve the transmission characteristics of the analog signal. Leaving the reset pulse carrier makes processing of the transmitted video signal more difficult, particularly if the length of electrical cable 13 is long since the bandwidth needed to transmit the signal without distortion is greater. Thus, the analog video output is provided to a correlated double sampling circuit (CDS) 34 (FIG. 2), a demodulating circuit, which "strips off" the reset pulse carrier leaving a sampled analog waveform 36 as shown in FIG. 4.

Referring again to FIG. 2, after removal of reset pulse carrier 30, the sampled analog waveform 36 is received by an automatic gain control (AGC) amplifier 38 which provides up to 25 dB of gain. The analog waveform input to the AGC is linear, with voltage directly proportional to incident light level. AGC amplifier 38 is generally responsive to a peak signal level or may be adjusted by external command. The amplified waveform is then received by a gamma-correction circuit 40 which extends black levels and compresses white levels, in order to approximate the logarithmic sensitivity of the human eye. A timing pulse from timing generator 24 indicates to gamma-correction circuit 40 that a portion of the waveform is a reference black shade 41 and is available to be used as a reference for DC level. For NTSC format, gamma correction is defined by the relationship $E_o = E_i^{1.42}$, whereas for PAL format, the relationship is $E_o = E_i^{2.21}$. Without gamma correction, black shades are about four times more sensitive to noise than white shades. Gamma correction may be provided using either analog or digital gamma correction methods. For reasons to be discussed below, a blanking circuit 42 is used to apply a fixed DC level to clean or blank out any noise within the horizontal and vertical blanking intervals.

Figure 4:
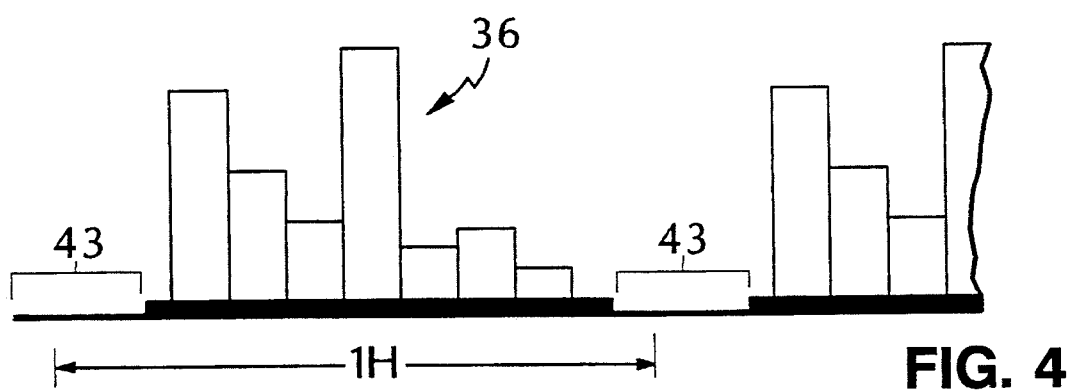
FIG. 4 represents the analog waveform of the video signal at letter b of FIG. 2.
Figure 5:
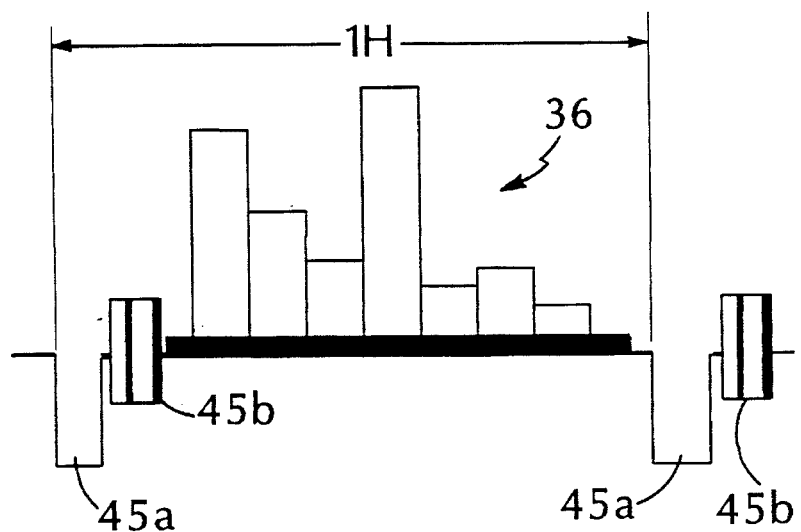
FIG. 5 represents the analog waveform of the video signal at letter c of FIG. 2.

The sampled analog waveform, designated at letter b and shown in FIG. 4, passes to an adder circuit 46 which applies, for every horizontally scanned line, a horizontal sync pulse 45a from timing generator 24 as well as a subcarrier pixel clock pulse 45b (7.16 MHz for 410K imagers), within a horizontal blanking interval (HBI) 43, blanked by blanking circuit 42, of the analog waveform. Referring to FIG. 5, the resultant waveform present at the output of adder circuit 46 is designated by letter c of FIG. 2. The pixel clock, generated by timing generator 24, serves as a reference indicating where the pixel information is located along the analog waveform and is used to synchronize the clock of the host video processor (described below).

Referring to FIG. 6, at the beginning of each one of the two interlaced vertical fields of a frame, blanking circuit 42 similarly provides blanking within vertical blanking intervals (VBI) 47. Within these blanking intervals, adder 46 provides a vertical sync pulse 48 generated by timing generator 24. The analog waveform signal is then conveyed using a video buffer 44 over a coaxial cable 13 to host video processor card 14 where the signal is processed for viewing on display monitor 17. The analog video waveform passing to video processing card 14 is a "minimally" processed analog video signal waveform which does not conform to any presently adopted standard but provides all of the information needed for decoding and processing.

Referring to FIG. 7A, cable 13 includes a conductor 50 for conveying the video signals surrounded by a shield conductor 52. A second pair of conductors 54, 56 provide +12 volts power and power return, respectively, for CCD 22.

The horizontal and vertical synchronizing signal and the pixel clock signal may alternatively be transmitted over separate wires, 50a, 50b, 50c, respectively, as shown in FIG. 7B.

Figure 8:
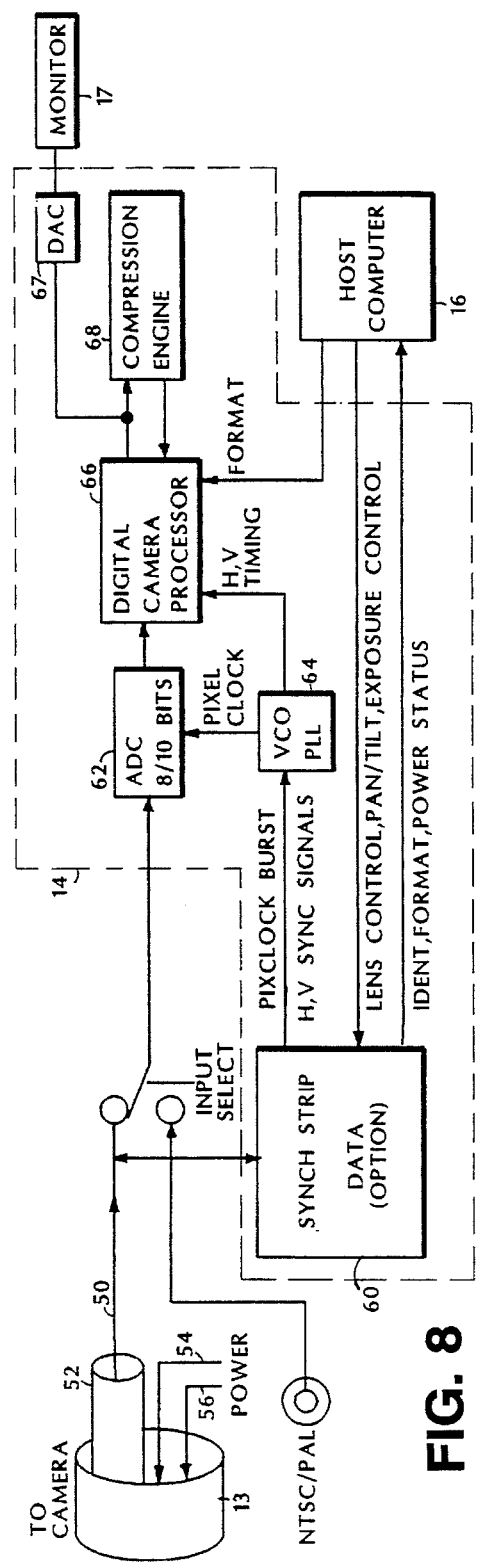
FIG. 8 is a block diagram of the external video processing system of FIG. 1.

Referring to FIG. 8, the analog video signal from camera head 12 is passed over cable 13 to host video processor card 14 where all of the digital processing occurs. The analog video signal is received by a sync separation circuit, such as Product No. EL4583C (Elantec, Inc., Milpitas, Calif.) video sync separator, which detects the sync pulses within HBI and VBI portions of the analog waveform and reproduces the horizontal and vertical synchronizing signals which were added by timing generator 24 within camera head 12. The analog video signal is also received by an analog/digital converter (ADC) 62 having at least 8 bit resolution and a 10 MHz sample rate. For example, an ADC circuit, Product No.

AD876, manufactured by Analog Devices, Norwood, Mass. may be used to generate an encoded digital signal representative of the active portion of the analog video signal (i.e., that part of the video waveform actually visible on a display screen). Sampling within the ADC 62 is performed at a sample rate controlled and generated by a voltage control oscillator (VCO) and phase-locked loop (PLL) circuit 64, such as Product No. ICS AV9170 PLL (Integrated Circuit Systems, Inc., Valley Forge, Pa.) for regenerating the pixel clock signal. The sample rate is dependent on the pixel clock signal extracted by demodulator 60.

The digitized video signal from ADC 62 is received by a digital camera processor 66, such as, Product No. CXD2130R, Sony Electronics, Inc., San Jose, Calif., which provides color stripe demodulation (CCD stripes to YUV) and automatic light balancing. In other applications, digital camera processor 66 may provide a multitude of additional tasks including some or all of the following:

- automatic gain control
- luminance derivation
- vertical and horizontal aperture correction
- noise reduction
- unsharp masking
- white balance
- gamma correction
- color space conversion to YUV
- YUV output
- bad pixel repair
- color correction
- exposure control coefficient generation
- high spatial-frequency coefficient generation for autofocus.

The digital signals processed by digital camera processor 66 can be reconverted into analog format using a digital to analog converter (DAC) 67 for display on monitor 17. In certain applications, however, further digital signal processing may be desirable before the signals are converted into their analog form. For example, as shown in FIG. 8, in a video teleconferencing system, a video compression engine 68 is used to compress the video signals in order to optimize transmission of the video data over a communication channel having limited bandwidth.

Figure 9:
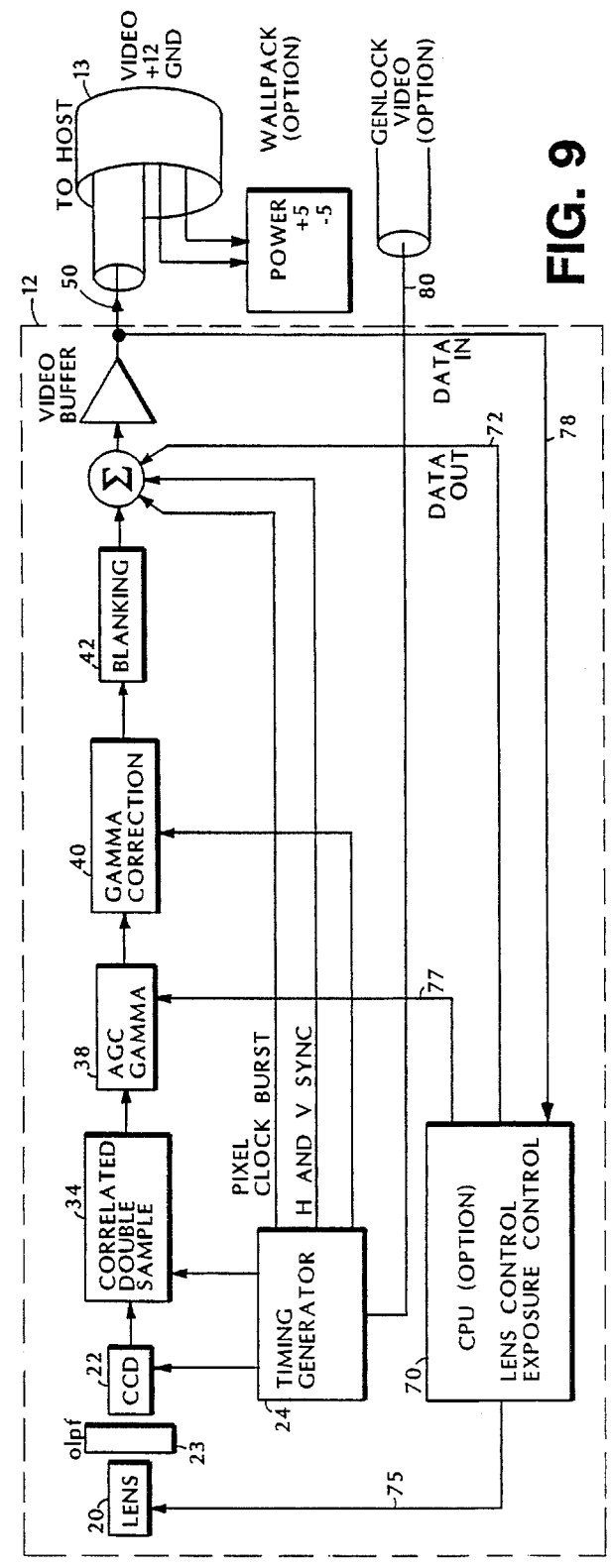
FIG. 9 is an alternate embodiment of an electronic camera head.

Other embodiments are within the claims. Referring to FIG. 9, bi-directional data communications between camera head 12 and host processor 14 for providing additional control and data base management functions uses a processor 70 positioned within camera head 12. Control signals are sent by computer 16 through host processor 14 along conductor 50 of cable 13 to processor 70 over line 78 during VBI portions of the analog video signal. The control signals received by processor 70 on line 78 may, for example, be used to vary the incident light exposure by controlling an iris in the lens system, or to control the position of the lens in relation to the CCD for focussing or zooming. Other control signals for panning or tilting camera head 12 or for controlling AGC 38 in response to light received by CCD 22 may also be provided by processor 70 along lines 75, 77, respectively. These control signals may also be transmitted to the camera head using an additional wire or pair of wires in cable 13.

Processor 70 may also be used to transmit data information within VBI portions of the analog video signal over line 50 by sending data along line 72 in the other direction as well. In this case, processor 70 provides information to computer 16 including, for example, camera identification, type of CCD, serial number, self-test status, and lens status.

Referring to FIG. 10, cable 13 may be modified to accommodate a multitude of camera heads 12. In this arrangement, cable 13 is terminated at both ends with a characteristic impedance matching that of the cable (e.g., 75Ω). Cameras 12 as well as video processing card 14 are connected, in parallel, along the length of cable in daisy-chained fashion. Although only one camera head is active at one time, the cameras may be genlocked by effectively interconnected timing generators 24, in response to signals along line 80 with the cameras switched during transmission of the active video signals to provide wipe effects.

In a preferred embodiment, bi-directional data communication between video processor card 14 and electronic camera head 12 makes use of the vertical blanking intervals in the following way. Each VBI consists of twenty horizontal intervals. Processor 70 uses odd numbered lines 7, 9, 11, 13, 15, 17, and 19 for receiving data from video processing card 14 to camera head 12 and even numbered lines 8, 10, . . . 18 for transmitting data in the other direction.

CCD 22 may be any of a variety of color stripe CCDs and may, depending on the application or geographical area of use, be in the NTSC, PAL, or SECAM (Sequential Color with Memory) format.

What is claimed is:

1. A video camera system comprising:
   an electronic camera head comprising:
   a solid-state video imager for providing a video signal waveform comprising analog video signals, and
   timing generating circuitry for generating horizontal and vertical synchronizing signals and a pixel clock signal;
   a host video processor, located externally from the electronic camera head for receiving the analog video signals from the solid-state video imager and the horizontal and vertical synchronizing signals and the pixel clock signal from the timing generating circuitry, comprising:
   an analog to digital converter for converting the analog video signals to digital video signals, and
   digital signal processing circuitry for processing the digital video signals; and
   an electrical cable for carrying the video signal waveform from the electronic camera head and the horizontal and vertical synchronizing signals and the pixel clock signal to the host video processor.

2. The video camera system of claim 1 wherein said camera head further comprises an adder circuit for adding the horizontal and vertical synchronizing signals to the video signal waveform to form a combined analog video signal waveform.

3. The video camera system of claim 2 wherein the adder circuit further adds the pixel clock signal to the combined analog video signal waveform.

4. The video camera system of claim 3 wherein the host video processor further comprises a filtering circuit for receiving and extracting the horizontal and vertical synchronizing signals from the combined analog video signal waveform.

5. The video camera system of claim 4 wherein the filtering circuit further extracts the pixel clock signal from the combined analog video signal waveform.

6. The video camera system of claim 1 wherein the electronic camera head further comprises a demodulator for receiving the analog video signals and generating demodulated video signals by extracting a reset pulse carrier signal from the analog video signals.

7. The video camera system of claim 3 wherein the electronic camera head further comprises a blanking circuit for blanking a portion of the video signal waveform; and wherein the adder circuit adds the horizontal and vertical synchronizing signals and the pixel clock signal to the blanked portion.

8. The video camera system of claim 2 wherein the electronic camera head further comprises a gamma correction circuit for providing gamma correction to the analog video signals before conveying the analog video signals to the adder circuit.

9. The video camera system of claim 4 wherein the host video processor further comprises a synchronizing circuit for receiving the pixel clock signal from the filtering circuit to synchronize the host video processor with the analog video signals.

10. The video camera system of claim 1 wherein the host video processor further comprises a digital to analog converter for converting the digital video signals processed by the digital signal processing circuitry to analog video signals for transmission to a display monitor.

11. The video camera system of claim 1 wherein the host video processor further comprises video compression circuitry for compressing the digital video signals processed by the digital signal processing circuitry.

12. The video camera system of claim 11 wherein the video compression circuitry is merged with the digital signal processing circuitry.

13. The video camera system of claim 1 wherein the camera head further comprises a processor for receiving control information from the host video processor and adding said control information to the analog video signals.

14. The video camera system of claim 1 wherein the solid-state video imager is a color-stripe solid-state video imager.

15. The video camera system of claim 1 wherein the electrical cable comprises a shielded coaxial cable for transmitting the video signal waveform.

16. The video camera system of claim 1 wherein the electrical cable comprises a pair of wires for providing electrical power to the solid-state video imager.

17. The video camera system of claim 1 wherein the horizontal synchronizing signal, the vertical synchronizing signal and the pixel clock signal are transmitted over a single wire of the electrical cable.

18. The video camera system of claim 1 wherein the horizontal synchronizing signal, the vertical synchronizing signal and the pixel clock signal are each transmitted over individual wires of the electrical cable.

19. An electronic camera comprising:

a solid-state color-stripe video imager for providing analog video signals, a demodulator for receiving the analog video signals and generating demodulated video signals by extracting a reset pulse signal from the analog video signals, a timing signal generator for generating horizontal and vertical synchronizing signals and a pixel clock signal, an adder circuit for generating an output video signal by adding the horizontal and vertical synchronizing signals, and the pixel clock signal, to the demodulated video signals and an electrical cable having a pair of conductors for carrying the output video signal from the adder circuit to an external video processor.

20. The electronic camera of claim 19 further comprising a blanking circuit for blanking a portion of the analog video signals; and wherein the adder circuit adds the horizontal and vertical synchronizing signals and the pixel clock signal to the blanked portion.

21. The electronic camera of claim 19 further comprising a gamma correction circuit for receiving the analog video signals from the demodulator, and providing gamma correction to the analog video signals before conveying the analog video signals to the adder circuit.

22. The electronic camera of claim 19 further comprising a processor for receiving input signals from the external video processor, and providing the input signals to the adder circuit for adding to the demodulated video signals.

23. The electronic camera of claim 22, wherein the processor generates, in response to the input signals, control signals to focus a lens system positioned at a location in spaced juxtaposition to a front face of the solid-state color-stripe video imager.

24. A method of providing an interface, within an electronic camera, for generating analog video output signals from a solid-state video imager to an external video digital processor, comprising the steps of:

providing a video waveform comprising analog video signals from the solid-state video imager, generating a horizontal synchronizing signal, a vertical synchronizing signal, and a pixel clock signal, and conveying the analog video signals from the solid-state video imager and the horizontal synchronizing signal, the vertical synchronizing signal, and the pixel clock signal to the external video digital processor over a length of analog video signal carrying cable.

25. The method of claim 24 further comprising the step of:

generating within the electronic camera an output analog video signal by adding the horizontal synchronizing signal, the vertical synchronizing signal, and the pixel clock signal to the analog video signals.

26. The method of claim 25 further comprising the step of:

generating within the electronic camera demodulated analog video signals by extracting a carrier signal from the analog video signals.

27. The method of claim 26 further comprising the steps of:

blanking a portion of the demodulated analog video signals; and adding the horizontal synchronizing signal and the vertical synchronizing signal to the blanked portion.

28. The method of claim 26 further comprising the step of gamma correcting the demodulated analog video signals.

29. The method of claim 26 further comprising the step of adding data information provided by the external video digital processor to the demodulated analog video signals.

30. The method of claim 24 further comprising the step of positioning, at a location in spaced juxtaposition to a front face of the solid-state video imager a lens system for focusing optical images on the front face of the solid-state video imager.

31. The method of claim 30 further comprising the step of controlling the distance between the lens system and solid-state video imager from a remote location.

32. The method of claim 27 further comprising the step of:

adding information control signals from said external video digital processor to said blanked portion.

33. The method of claim 32 further comprising the step of including camera control data in said information control signals.

* * * * *